United States Patent
Taghavi (10) Patent No.: US 10,592,786 B2
(45) Date of Patent: Mar. 17, 2020

(54) GENERATING LABELED DATA FOR DEEP OBJECT TRACKING

(71) Applicant: Ehsan Taghavi, Toronto (CA)

(72) Inventor: Ehsan Taghavi, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 15/676,682

(22) Filed: Aug. 14, 2017

(65) Prior Publication Data

US 2019/0050693 A1 Feb. 14, 2019

(51) Int. Cl.
G06K 9/66 (2006.01)
G06K 9/00 (2006.01)
G06T 7/246 (2017.01)

(52) U.S. Cl.
CPC ........... G06K 9/66 (2013.01); G06K 9/00295 (2013.01); G06K 9/00718 (2013.01); G06T 7/246 (2017.01); G06T 2207/20081 (2013.01); G06T 2207/20084 (2013.01)

(58) Field of Classification Search
None
See application file for complete search history.

(56) References Cited

U.S. PATENT DOCUMENTS 5,724,487 A * 3/1998 Streit ................. G06N 3/04
706/25
2015/0310458 A1* 10/2015 Bernal ............... G06Q 30/0201
382/103
2017/0255832 A1* 9/2017 Jones ................. G06K 9/00718
2017/0262995 A1* 9/2017 Li ..................... G06N 3/0445
2018/0005047 A1* 1/2018 Yu .................... G06K 9/6271
2018/0007382 A1* 1/2018 Pio ..................... H04N 19/52
2018/0018524 A1* 1/2018 Yao ................... G06K 9/00771
2018/0089505 A1* 3/2018 El-Khamy ............ G06T 7/11
(Continued)

FOREIGN PATENT DOCUMENTS

CN 105654509 A 6/2016
CN 106056628 A 10/2016
(Continued)

OTHER PUBLICATIONS

Zeng, Xingyu, et al. "Deep learning of scene-specific classifier for pedestrian detection." European Conference on Computer Vision. Springer, Cham, 2014. (Year: 2014).*
(Continued)

Primary Examiner — Andrae S Allison (57) ABSTRACT

Methods and systems for generating an annotated dataset for training a deep tracking neural network, and training of the neural network using the annotated dataset. For each object in each frame of a dataset, one or more likelihood functions are calculated to correlate feature score of the object with respective feature scores each associated with one or more previously assigned target identifiers (IDs) in a selected range of frames. A target ID is assigned to the object by assigning a previously assigned target ID associated with a calculated highest likelihood or assigning a new target ID. Track management is performed according to a predefined track management scheme to assign a track type to the object. This is performed for all objects in all frames of the dataset. The resulting annotated dataset contains target IDs and track types assigned to all objects in all frames.

20 Claims, 7 Drawing Sheets

(56) References Cited

U.S. PATENT DOCUMENTS

| | | | |
|---|---|---|---|
| 2018/0129906 A1* | 5/2018 | Habibian | G06K 9/4628 |
| 2018/0158189 A1* | 6/2018 | Yedla | G06T 7/11 |
| 2018/0173971 A1* | 6/2018 | Jia | G06K 9/00805 |
| 2018/0246521 A1* | 8/2018 | Seo | H04N 5/2356 |

FOREIGN PATENT DOCUMENTS

| | | |
|---|---|---|
| CN | 106097391 A | 11/2016 |
| CN | 106650630 A | 5/2017 |
| CN | 106845385 A | 6/2017 |
| WO | 2017088050 A1 | 6/2017 |

OTHER PUBLICATIONS

Savchenko, A. V. "Deep neural networks and maximum likelihood search for approximate nearest neighbor in video-based image recognition." Journal Optical Memory and Neural Networks vol. 26 Issue 2, Apr. 2017, pp. 129-136 (Year: 2017).*

Nam, Hyeonseob, Mooyeol Baek, and Bohyung Han. "Modeling and propagating cnns in a tree structure for visual tracking." arXiv preprint arXiv:1608.07242 (2016). (Year: 2016).*

Masala et al, 2D Recurrent Neural Networks for Robust Visual Tracking of Non-Rigid Bodies, EANN 2016, CCIS 629, pp. 18-34, 2016. (Year: 2016).*

Streit et al, Maximum Likelihood Training of Probabilistic Neural Networks, IEEE Transactions on Neural Networks, vol. 5, No. 5, Sep. 1994 (Year: 1994).*

Bae, Seung-Hwan, and Kuk-Jin Yoon. "Robust online multi-object tracking based on tracklet confidence and online discriminative appearance learning." Proceedings of the IEEE conference on computer vision and pattern recognition. 2014. (Year: 2014).*

* cited by examiner

GENERATING LABELED DATA FOR DEEP OBJECT TRACKING

FIELD

The present disclosure is related to target tracking in neural networks. In particular, the present disclosure describes methods and systems for annotating data for training neural networks to track multiple targets.

BACKGROUND

Tracking via deep neural networks (DNNs) is a type of machine learning (ML), and has advantages over other tracking methods such as using the classical Kalman filter and its known extensions. Typically, tracking using DNN (also referred to as deep tracking neural networks or simply deep tracking) require the DNN to be trained based on training datasets. These datasets may be annotated to contain object labels and occasionally annotated manually to apply tracking identifiers (IDs) to tracked objects. However, datasets typically are not annotated with any other temporal characteristics of the objects. The lack of massive datasets with such annotations to train the DNN is likely to mean that the resulting deep tracking algorithm would not perform well in practical real-life applications, such as in an autonomous vehicle where tracking multiple objects with different motion models is important.

The way in which most DNN tracking algorithms are trained is usually lacking in fully observed temporal behavior of the objects in the dataset, and is also usually limited in the amount of datasets that have annotations related to tracks. The cost of annotating data manually with high detail (e.g., including target IDs and track types) is high, and different track management rules are typically difficult for a human to follow.

SUMMARY

The example methods and systems described herein enable automatic annotation of a dataset, including annotation of temporal characteristics such as target IDs and track types over several frames of data. Objects detected in a sequence of frames can be correlated (e.g., using a likelihood function) to automatically label an object with the appropriate target ID over the frames, and to automatically determine the track type for the object over those frames. The disclosed examples enable different track management schemes to be automatically applied for annotating a dataset. The resulting annotated dataset may be used for training DNN tracking algorithms.

In some aspects, the present disclosure describes a method for generating an annotated dataset for training a deep tracking neural network. For an object of interest in a frame of interest, within a plurality of frames of a dataset, the method includes calculating one or more likelihood functions to correlate feature score of the object of interest with respective feature scores each associated with one or more previously assigned target identifiers (IDs) in a selected range of frames. The method also includes assigning a target ID to the object of interest by: identifying a previously assigned target ID associated with a calculated highest likelihood and assigning the identified target ID to the object of interest; or initiating a new target ID when none of the previously assigned target IDs is associated with a calculated likelihood that satisfies a predetermined threshold and assigning the initiated new target ID to the object of interest. The method also includes performing track management according to a predefined track management scheme to assign a track type to the object of interest. The method includes iterating the calculating, assigning and performing for all objects in all frames of the dataset, and outputting the annotated dataset, wherein the annotated dataset contains target IDs and track types assigned to all objects in all frames.

In any of the preceding aspects/embodiments, the method may include, for a first frame in the plurality of frames, initiating and assigning a new target ID to each object identified in the first frame.

In any of the preceding aspects/embodiments, the method may include obtaining object labels for all objects in all the frames of the dataset.

In any of the preceding aspects/embodiments, obtaining object labels may include applying an object detection algorithm.

In any of the preceding aspects/embodiments, the method may include obtaining feature scores for all objects in all the frames of the data set.

In any of the preceding aspects/embodiments, obtaining feature scores may include calculating a feature map function for each object.

In any of the preceding aspects/embodiments, the method may include performing track management again on the annotated dataset, using a different track management scheme, to obtain a different annotated dataset containing track types differently assigned to all objects in all frames.

In some aspects, the present disclosure describes a system comprising: a processor and a memory coupled to the processor. The memory stores computer-executing instructions that, when executed by the processor, cause the system to, for an object of interest in a frame of interest, within a plurality of frames of a dataset, calculate one or more likelihood functions to correlate feature score of the object of interest with respective feature scores each associated with one or more previously assigned target identifiers (IDs) in a selected range of frames. The instructions further cause the system to assign a target ID to the object of interest by: identifying a previously assigned target ID associated with a calculated highest likelihood and assigning the identified target ID to the object of interest; or initiating a new target ID when none of the previously assigned target IDs is associated with a calculated likelihood that satisfies a predetermined threshold and assigning the initiated new target ID to the object of interest. The instructions further cause the system to perform track management according to a predefined track management scheme to assign a track type to the object of interest. The instructions further cause the system to iterate the calculating, assigning and performing for all objects in all frames of the dataset, and output the annotated dataset, wherein the annotated dataset contains target IDs and track types assigned to all objects in all frames.

In any of the preceding aspects/embodiments, the instructions, when executed by the processor, may further cause the system to, for a first frame in the plurality of frames, initiate and assigning a new target ID to each object identified in the first frame.

In any of the preceding aspects/embodiments, the instructions, when executed by the processor, may further cause the system to obtain object labels for all objects in all the frames of the dataset.

In any of the preceding aspects/embodiments, obtaining object labels may include applying an object detection algorithm.

In any of the preceding aspects/embodiments, the instructions, when executed by the processor, may further cause the system to obtain feature scores for all objects in all the frames of the data set.

In any of the preceding aspects/embodiments, obtaining feature scores may include calculating a feature map function for each object.

In any of the preceding aspects/embodiments, the instructions, when executed by the processor, may further cause the system to perform track management again on the annotated dataset, using a different track management scheme, to obtain a different annotated dataset containing track types differently assigned to all objects in all frames.

In some aspects, the present disclosure describes a method of training a deep tracking neural network. The method includes inputting a training dataset to an input layer of the deep tracking neural network. The method also includes generating a first error vector to compare output of the deep tracking neural network to a first annotated dataset that contains temporal information for the training dataset. The temporal information includes target identifiers (IDs) and track type assigned to each object in each frame of the training dataset. The method also includes adjusting weighting of the deep tracking neural network to reduce the first error vector.

In any of the preceding aspects/embodiments, the first annotated dataset may contain temporal information assigned in accordance with a first track management scheme. The method may include training the deep tracking neural network according to a second track management scheme by: providing a second annotated dataset that contains temporal information for the training dataset that is assigned in accordance with the second track management scheme; generating a second error vector to compare output of the deep tracking neural network to the second annotated dataset; and adjusting weighting of the deep tracking neural network to reduce the second error vector.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The performance of a deep tracking algorithm is dependent on the datasets used during the training phase. In order for the deep tracking algorithm to accurately perform tracking, it is desirable for the algorithm to be trained using datasets annotated with object labels as well as information about the temporal characteristics of the tracked objects, for example including target IDs and track types (e.g., tentative, confirmed or dead) according to a track management scheme. Known uncertainty or confidence in detection of the tracked objects can also be taken into account when annotating the dataset.

Conventionally, datasets used for training deep tracking algorithms have been limited, because it is difficult and costly to manually annotate data with details such as target IDs and track types. Most conventional datasets have been focused on detecting and identifying different objects in a single frame. Few datasets have been annotated with target IDs over multiple frames and even fewer have been annotated with track management information. In particular, it is difficult for a human to manually apply a track management scheme for annotating track types, particularly if different track management schemes are to be applied. Further, manual annotation of datasets typically cannot take into account the uncertainty of object detection. Most datasets used for training deep tracking algorithms typically do not include annotations based on track management.

In order to train deep tracking algorithms in how to track multiple objects over time, in image data or any other sensory data (e.g., including lidar, radar or other such data), there is a need to label large amounts of data in detail. In examples described herein, methods and systems are provided that generate an annotated dataset that may be suitable for use in training DNN tracking algorithms, with little or no human input.

The present disclosure makes reference to frames of data, where each frame captures a set of data at a given instant in time. It should be understood that the term frame is used to refer generally to a set of data captured at an instant in time, and the present disclosure is not limited to image or video data.

In a dataset that is not annotated with target IDs and track type, temporal characteristics about objects in the dataset may be lost. An example of this is illustrated in FIG. 1.

Figure 1:
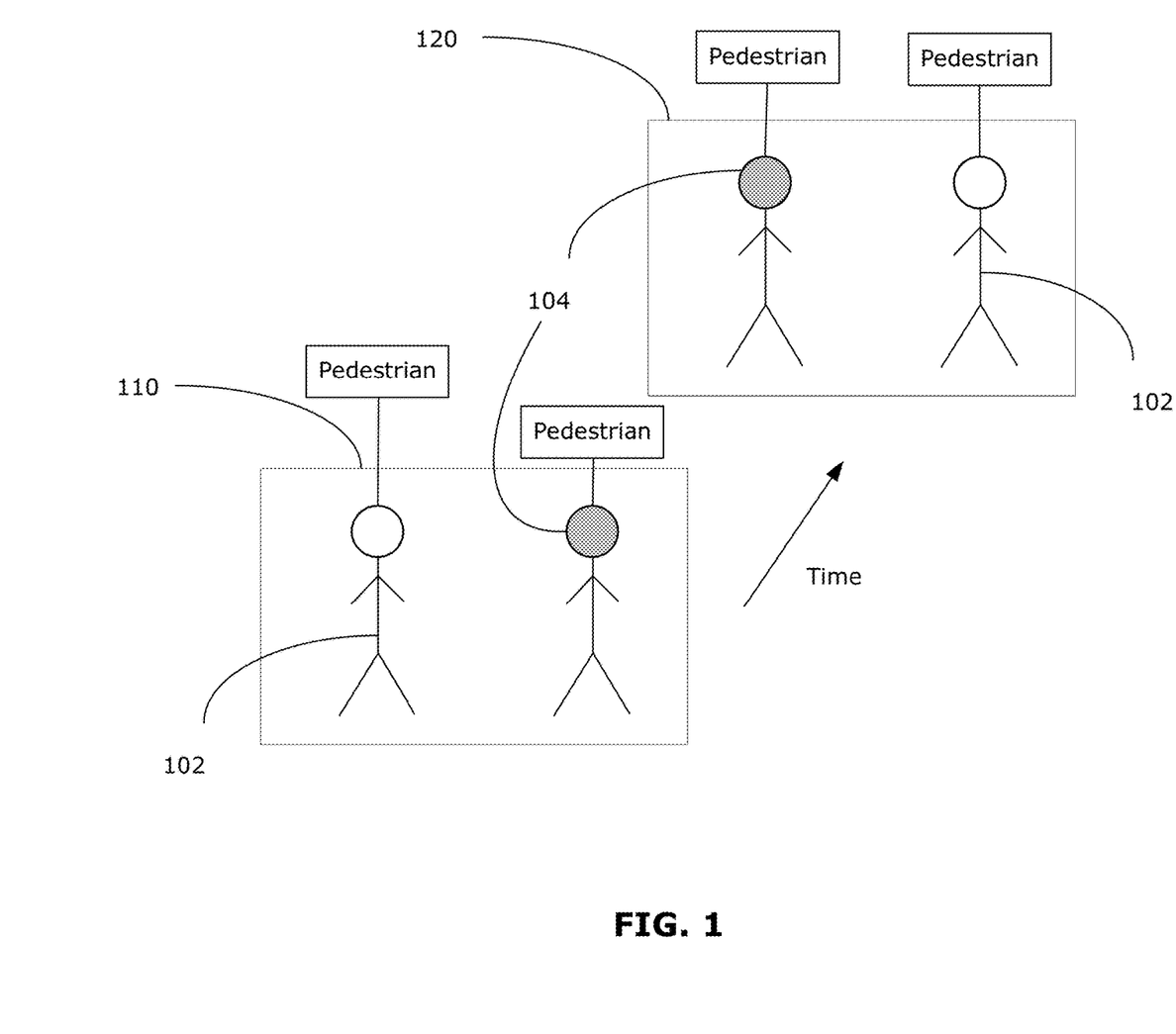
FIG. 1 is a diagram illustrating an example dataset lacking annotations for temporal characteristics.

In FIG. 1, two frames 110, 120 of a video are shown. The first frame 110 captures two similar objects 102, 104. The second frame 120 follows the first frame 110 and captures data at a later point in time. In the second frame 120, the two objects 102, 104 have switched positions. Using any suitable object detection algorithm, the objects 102, 104 may be detected in each frame 110, 120 and labeled appropriately (e.g., detected and labeled as pedestrians in the example shown). Further, appropriate bounding boxes (not shown) may be determined for each detected object 102, 104. It should be noted that the present disclosure makes reference to object detection, however use of this term is intended to include various methods of object detection, including object recognition, segmentation and localization, for example. Regardless of the object detection algorithm used, such detection does not provide information about the temporal characteristics of the objects in a sequence of frames. For example, although the objects 102, 104 may have been detected and labeled as pedestrians in each of the frames 110, 120, such object detection does not provide any information to indicate that the objects 102, 104 have switched positioned in the second frame 120. A deep tracking algorithm that is trained using a dataset that lacks such track information may thus be less accurate for tracking multiple similar objects.

Even in a dataset that has been manually annotated to include target IDs to distinguish between two similar objects 102, 104 in multiple frames 110, 120, track management information is typically lacking. For example, the dataset may lack any track information, or the track information may be oversimplified (e.g., limited to binary indication of whether a track is present or not present). This is because it is difficult for a human to manually apply the rules of a track management scheme. Further, it is costly and time-consuming for a human to apply different track management schemes to the same set of data, to produce differently annotated datasets.

To properly train a deep tracking algorithm to perform tracking over multiple frames of data, the training dataset should include track management information. A track management scheme defines how a track is identified as one of several track types, for example tentative, confirmed or dead. By annotating the track type of an object over a sequence of frames, information about the motion of the tracked object provided in the dataset.

Figure 2:
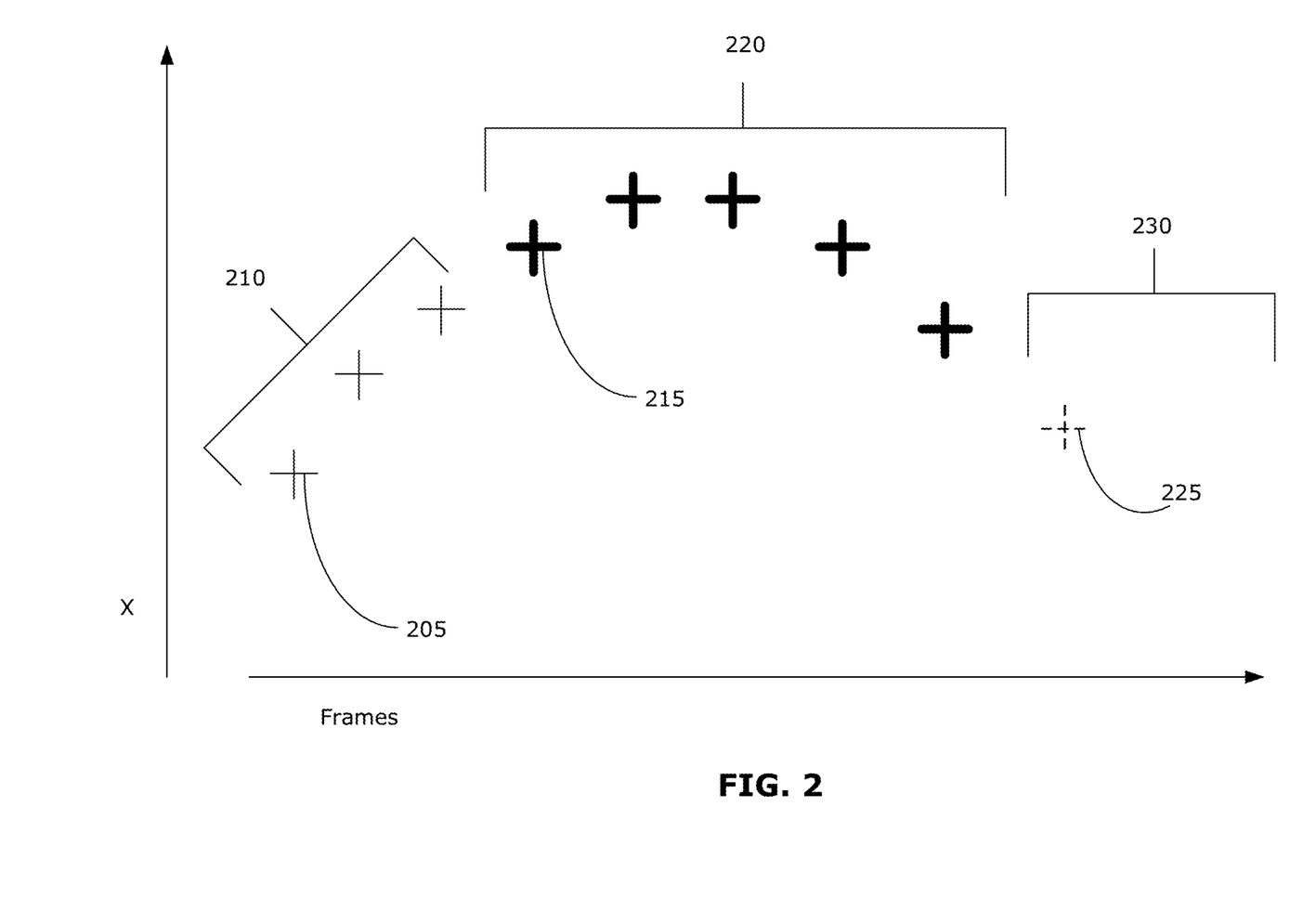
FIG. 2 is a diagram illustrating an example track management scheme.

FIG. 2 is a diagram illustrating an example track management scheme applied to the motion of a tracked object. For simplicity, FIG. 2 illustrates a single object (shown as a crosshair) moving in a single dimension (the x-axis in this example) over multiple frames.

Typical track management serves to initiate a track as tentative, promote a tentative track to a confirmed track, demote a tentative track to dead track or demote a confirmed track to dead track. Track management may be based on a set of rules, defined by a track management scheme. The set of rules may also account for confidence of object detection. Generally, track management involves applying the defined set of rules in each individual frame, by evaluating previous frames as well as the current frame. An example track management scheme may be defined as follows:

Tentative track: An initially detected object is initially assigned a tentative track for the earliest frame in which that object is detected. This indicates that the track has not been confirmed to be associated with an actual tracked object.

Confirmed track: A confirmed track indicates that the track has been determined to be associated with a valid tacked object. A tentative track is promoted to confirmed track when the tentative track satisfies certain requirements defined by the track management scheme. For example, a tentative track may be promoted to a confirmed track when the associated object is detected in three consecutive previous frames as well as a current frame, or is detected in four out of seven consecutive previous frames and including the current frame. Confidence in object detection may also be taken into account for promoting a tentative track. For example, a tentative track may be promoted to a confirmed track when the associated object is detected with confidence level over 0.7 for three consecutive previous frames as well as the current frame. The detected object is assigned a confirmed track in the earliest frame in which the promotion criteria is satisfied.

Dead track: A tentative track is demoted to dead track when the associated object cannot be consistently detected (e.g., fails the requirement for promotion to confirmed track). This indicates that the tentative track was a false positive detection. A confirmed track is demoted to dead track when the associated object no longer satisfies the requirements for confirmed track, as defined by the track management scheme. For example, a confirmed track may be demoted to dead track when the associated object is detected in less than four consecutive frames (starting from the current frame and going back in time), or less than four out of seven consecutive frames (starting from the current frame and going back in time). Confidence in object detection may also be taken into account for demoting a confirmed track. For example, a confirmed track may be demoted to a dead track when the associated object is detected with confidence level less than 0.7 for four consecutive frames (starting from the current frame and going back in time). At the frame where a track has been demoted to dead track, all information associated with that track (e.g., target ID, object label and track type) is removed from annotation.

In the example of FIG. 2, an object is initially detected at a first frame 205. A tentative track is initiated and assigned to the object at the first frame 205. In this example, the criteria for promotion to confirmed track is that the object must be detected for four consecutive frames, starting from the current frame and going back in time. Thus, for the first three frames 210, the object is assigned a tentative track because there are an insufficient number of frames to satisfy the criteria for promotion. At the fourth frame 215, the criteria for promotion to confirmed track is satisfied. Thus, for the following frames 220, the object is assigned a confirmed track. At the ninth frame 225, the object is no longer detected (indicated by dashed lines). Thus, for subsequent frames 230 starting from the ninth frame 225, the track is dead and annotation for the object is removed from those frames 230.

The above description of FIG. 2 has been simplified to illustrate how track management may be carried out. For training a deep tracking algorithm, the dataset may be additionally annotated with target IDs and object labels associated with detected objects in each frame.

Figure 4:
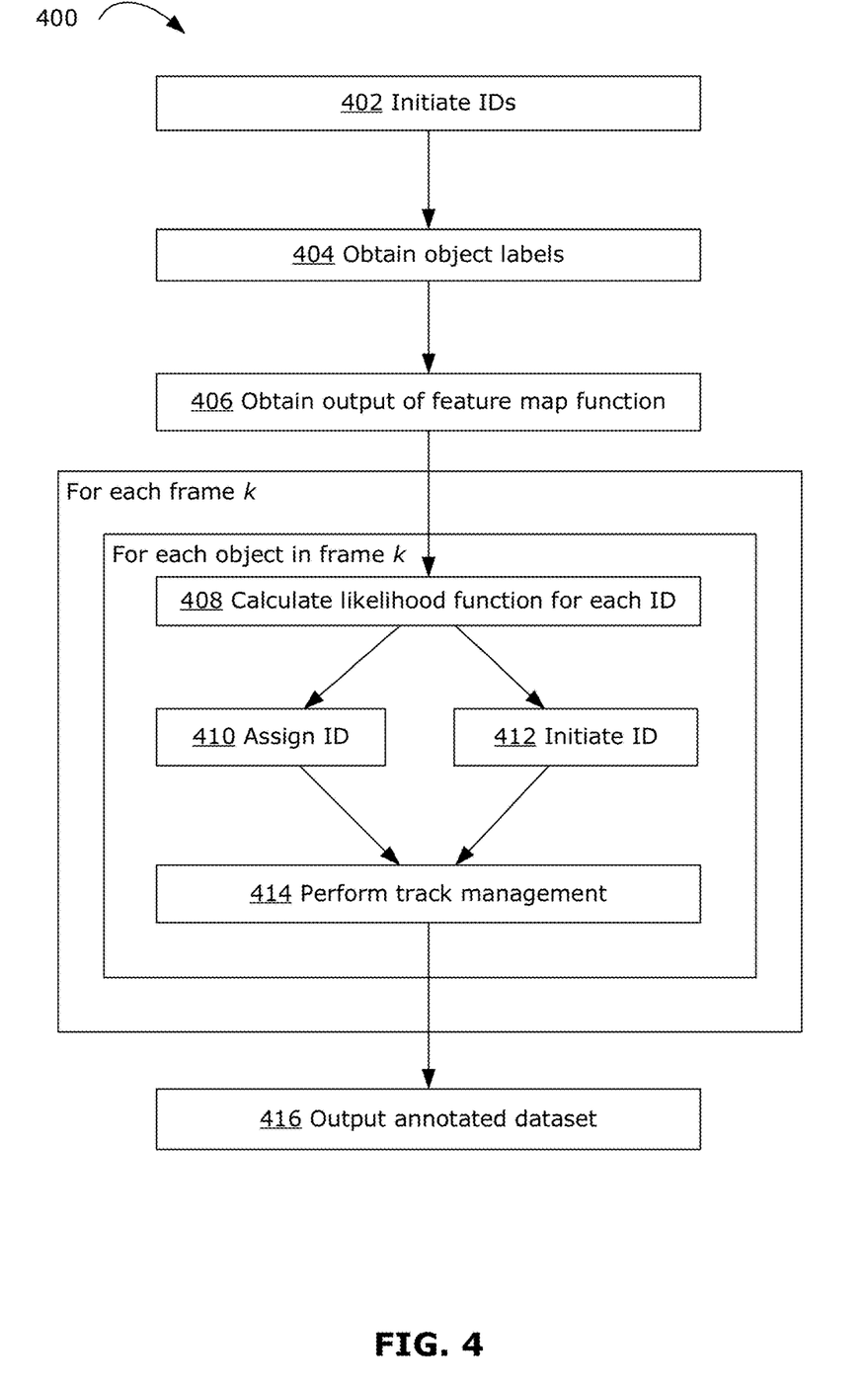
FIG. 4 is a flowchart illustrating the example method applied in FIG. 3.

FIG. 4 is a flowchart illustrating an example method 400 for automatically annotating a dataset. The method 400 may be carried out using a processing system, for example as described further below.

The method 400 may be performed on a finite set of frames, and it may not be necessary to perform the method 400 in real-time. That is, the method 400 may be performed on a previously collected set of frames. Further, the method 400 may be performed retrospectively on a previously annotated dataset. For example, the method 400 may be performed on a dataset that was previously annotated with target IDs and object labels, but lacking track management information. In another example, the method 400 may be performed on a dataset that was previously annotated using first track management scheme, to generate a new data set using a different track management scheme.

Figure 3:
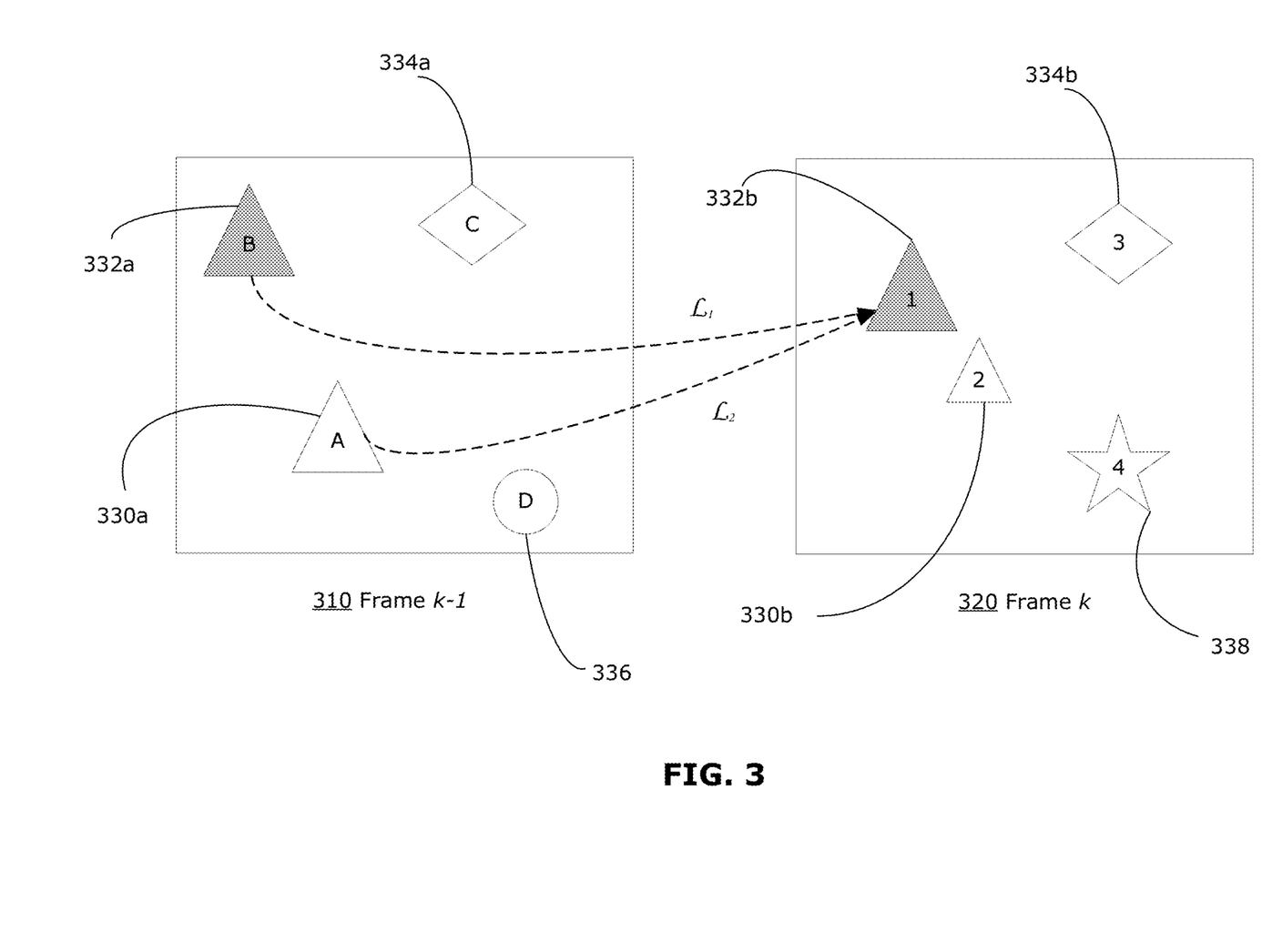
FIG. 3 is a diagram illustrating application of an example method for annotating a dataset.

To assist in understanding, the method 400 will be discussed with reference to the example shown in FIG. 3. FIG. 3 illustrates two consecutive frames, frame k−1 310 and frame k 320.

It is assumed that frame k−1 310 has been fully annotated. In frame k−1 310, four objects are detected and assigned respective unique target IDs, specifically first detected object 330a is assigned A, second detected object 332a is assigned B, third detected object 334a is assigned C and fourth detected object 336 is assigned D. Each detected object is also assigned an object label and track type (not shown). The annotations of frame k−1 310 are used for annotating frame k 320.

In next frame k 320, four objects are detected. The four detected objects are indexed as object 1 332b, object 2 330b, object 3 334b and object 4 338. It should be noted that the objects 330b, 332b, 334b, 338 detected in frame k 320 are not necessarily indexed in the same order as the objects 330a, 332a, 334a, 336 detected in frame k−1 310. The example method 400 may be performed to relate the objects 330b, 332b, 334b, 338 detected in frame k 320 to the objects 330a, 332a, 334a, 336 detected in frame k−1 310. This enables accurate annotation of frame k 320, based on the annotation of frame k−1 310.

At 402, target IDs are initiated for all objects detected in a first frame. The first frame may be the first temporal frame in a sequence of frames. If the dataset initially does not have any target IDs, 402 may include assigning target IDs to the objects detected in the first frame. In cases where the dataset already includes target IDs, 402 may include extracting the existing target IDs from the first frame. In the example of FIG. 3, if frame k−1 310 is the first temporal frame, the target IDs A, B, C, D assigned to the objects 330*a*, 332*a*, 334*a*, 336 may be initialized arbitrarily.

At 404, object labels are obtained for all objects detected in all the frames. Obtaining object labels may involve performing any suitable object detection algorithm to detect and identify objects in the frames. In some examples, obtaining object labels may involve retrieving previously determined object labels (e.g., from stored ground truth data, such as manually assigned labels, or from the results of a previous instance of object detection). Additionally, bounding boxes may be obtained for each object in a similar way. Generally, object detection may be performed ahead of time, prior to the method 400, in which case 404 may involve retrieving the object labels from a memory.

In the example of FIG. 3, the object labels and bounding boxes are obtained for objects 330*b*, 332*b*, 334*b*, 338 in frame k, and for objects 330*a*, 332*a*, 334*a*, 336 in frame k−1.

At 406, the output of at least one feature map function H is obtained for each identified object in all the frames. The feature map function that is used may be any suitable feature map function. The feature map function that is used for each object may be selected according to the label of each object. For example, the feature map function may be selected to be relevant to the object label for the object of interest (e.g., for object 332*b*, the object label may be "triangle" and a feature map function for straight lines or sharp angles may be selected). The output of the feature map function may be a feature vector or may be a scalar value. For simplicity, the output of the feature map function, including feature vectors and scalar outputs, may be referred to herein as a feature score.

In some examples, the feature map function may be calculated ahead of time, prior to the method 400, in which case 406 may involve retrieving the calculated output from a memory.

The method 400 then iterates through each frame k (other than the first frame that was initiated at 402). For each frame k, the method 400 iterates through each object identified in the frame.

408 to 414 may be performed for each object identified in frame k. The following discussion refers to a single instance of 408 to 414, for an object of interest in frame k that is to be labeled with a target ID. 408 to 414 may be iterated through all objects in frame k and further through all frames until all identified objects in all frames of the dataset have been labeled. To assist in understanding, the following discussion provides an example for object 332*b* in frame k, however it should be understood that a similar process may be carried out for each of the objects identified in frame k.

At 408, a likelihood function is calculated to correlate each target ID, existing in a selected range of frames, to the object of interest in frame k. A high likelihood indicates a high correlation with the object of interest.

The selected range of frames may be generalized as frames k−m to k+n, m being any positive integer equal to or greater than 1 and n being zero or any positive integer (provided k−m and k+n fall within the range of available frames). At minimum, only frame k−1 and frame k are selected for the likelihood calculation; at maximum, all available frames in the dataset are selected. The greater the number of frames selected for the likelihood calculation, the higher the accuracy of the assignment of target IDs. However, the trade-off is a greater use of processing resources. Because the method 400 is not required to be performed in real-time, and because it is generally desirable to have high accuracy in the annotation of the dataset in order to properly train a deep tracking algorithm, it may be acceptable to incur higher processing cost in favor of greater accuracy. For example, selecting the range of frames from k−2 to k+1 may provide a suitable balance of accuracy and processing cost.

The likelihood function $\mathcal{L}$ is calculated using the feature scores (obtained at 406) for the objects in the frames k−m to k+n. The likelihood function may be any suitable likelihood function, for example selected based on the application or the sensor.

Mathematically, the feature map functions used to correlate target IDs to the object of interest may be expressed as:

$$H^{1:i_{k-m}}(k-m), \ldots H^{i_k}(k), \ldots H^{1:i_{k+n}}(k+n)$$

Where $H^i(k)$ denotes the feature map function H calculated for the i-th object in frame k, where $1:i_{k-m}$ is the index of objects identified in frame k−m, where $i_k$ denotes the object of interest to be labeled in frame k, and where k−m to k+n is the range of frames being considered.

In some examples, the likelihood function is calculated to correlate only a subset of the identified objects in the k−m to k+n range of frames. For example, it may be more efficient to calculate the likelihood function only for those objects that have the same object label as the object of interest. In the example where the object of interest is the object 332*b* in FIG. 3 (having object label "triangle"), the likelihood function may be calculated to correlate only objects 330*a*, 332*a* in frame k−1 310 that also have the object label "triangle".

In the example of FIG. 3, likelihood functions may be calculated to determine the correlation of the given object 332*b* with object 330*a* (having target ID A) and object 332*a* (having target ID B) in frame k−1 310. Mathematically, this may be expressed as:

$$\mathcal{L}_1(H^B(k-1), H^1(k))$$

$$\mathcal{L}_2(H^A(k-1), H^1(k))$$

It should be understood that this example may be extended to consider frames earlier than k−1 and similarly to consider frames after k. Where frames after k are considered, the later frames are not yet labeled with any target ID, but may help to improve the accuracy of the correlation.

The likelihood functions may also be weighted or otherwise assigned respective confidence levels, for example to account for confidence of the sensor data and/or object detection algorithm.

At 410, the target ID is assigned to the object of interest in frame k according to the result of the likelihood calculation. The larger the value of the likelihood function $\mathcal{L}$ the better the match with the object of interest.

Assigning the target ID may involve identifying the target ID(s) having likelihood function(s) exceeding a predetermined threshold (e.g., greater than 0.7) and further identifying the target ID having the highest likelihood function that exceeds the threshold, and assigning the identified target ID to the object of interest. Once a target ID has been assigned to an object in frame k, that target ID is removed from consideration for other objects in frame k.

In the example of FIG. 3, the calculated likelihood functions may be $\mathcal{L}_1=0.95$ and $\mathcal{L}_2=0.6$. Then target ID B is identified as having the highest likelihood function that exceeds a predetermined threshold and object 332b is assigned target ID B. Target ID B is then removed from consideration for the remaining objects in frame k 320.

At 412, if an object in frame k cannot be assigned an existing target ID (e.g., all existing target IDs have been assigned to other objects in the frame, or the likelihood calculated for all existing target IDs is below the predetermined threshold), a new target ID may be initiated and assigned to that object. This indicates that the object associated with the new target ID is newly appearing in frame k.

It should be noted that an existing target ID may be unassigned to any object in frame k, indicating that the object associated with that target ID has not been found in frame k.

At 414, track management is performed, in accordance with a predetermined track management scheme. This may involve evaluating the target ID newly assigned to the object of interest in frame k according to the track management scheme and assigning a track type to the object of interest in frame k according to the track management scheme. By performing track management within each iteration, target IDs may be more efficiently and/or more accurately assigned in subsequent frames. For example, performing track management may allow for a target ID to be assigned a dead track and thus that target ID may be removed from consideration for later frames.

408 to 414 is iterated for each object in frame k and for all frames in the dataset.

In some examples, track management may be performed outside of the iterations. That is, track management may be performed after all objects in all frames have been assigned target IDs. Such an approach may enable different track management schemes to be applied, to generate multiple differently annotated datasets, without having to iterate through all the frames and objects to re-assign target IDs, thus saving computing resources.

In some examples, different track management schemes may result in target IDs being differently assigned to objects. In such cases, it may be necessary to iterate through all the frames and objects to re-assign target IDs, in order to accurately annotate the dataset according to different track management schemes.

At 416, the resulting annotated dataset is outputted. In the annotated dataset, each identified object in each frame has been labeled with temporal information, in addition to non-temporal object labels. Annotation with temporal information includes target IDs and track types that have been assigned to each identified object in each frame. As noted previously, such information is considered to be temporal because they take into account changes (e.g., motion) of an object through two or more frames.

It is currently prohibitively time-consuming and expensive, if not impossible, to provide a large dataset that has been annotated with such temporal information. This is because the current approach to annotating datasets relies on largely manual labeling. A typical dataset may contain frames captured at 30 frames per second (fps) and have on average 3-10 identified objects per frame. To be useful, a dataset should contain at least 5-10 minutes of data. This means that there would be at least 9000 frames to be annotated, with on average 3-10 objects per frame. To apply a track management scheme, each object would have to be evaluated over a series of frames, which is difficult for a human to do with high accuracy. Further, a deep tracking neural network would require several hours of such data for training. It should be readily appreciated by one skilled in the art that the human effort required to manually label the dataset in this way would be prohibitively time-consuming and expensive, and the result would not be guaranteed to be sufficiently accurate.

Using examples disclosed herein, a dataset may be annotated with suitable temporal information, where objects are assigned temporal information using an automated approach. Although non-temporal information (e.g., object identification and object labels) may be assigned using a manual, semi-automated or fully-automated approach, the temporal information is assigned using a fully-automated approach. Although a human may further verify that the temporal information has been accurately assigned, nonetheless the assignment of temporal information is performed without the involvement of a human. The annotated dataset may be stored in internal or external memory, and/or may be transmitted to another system. The annotated dataset may be used to train a deep tracking neural network.

In some cases, the disclosed examples enable uncertainty in the object detection algorithm and/or confidence of sensor data to be taken into account. For example, sensor uncertainty may be included in evaluating the likelihood function by applying the confidence level of sensor data to the value of the likelihood function. This would be difficult if not impossible if using a manual approach.

Figure 5:
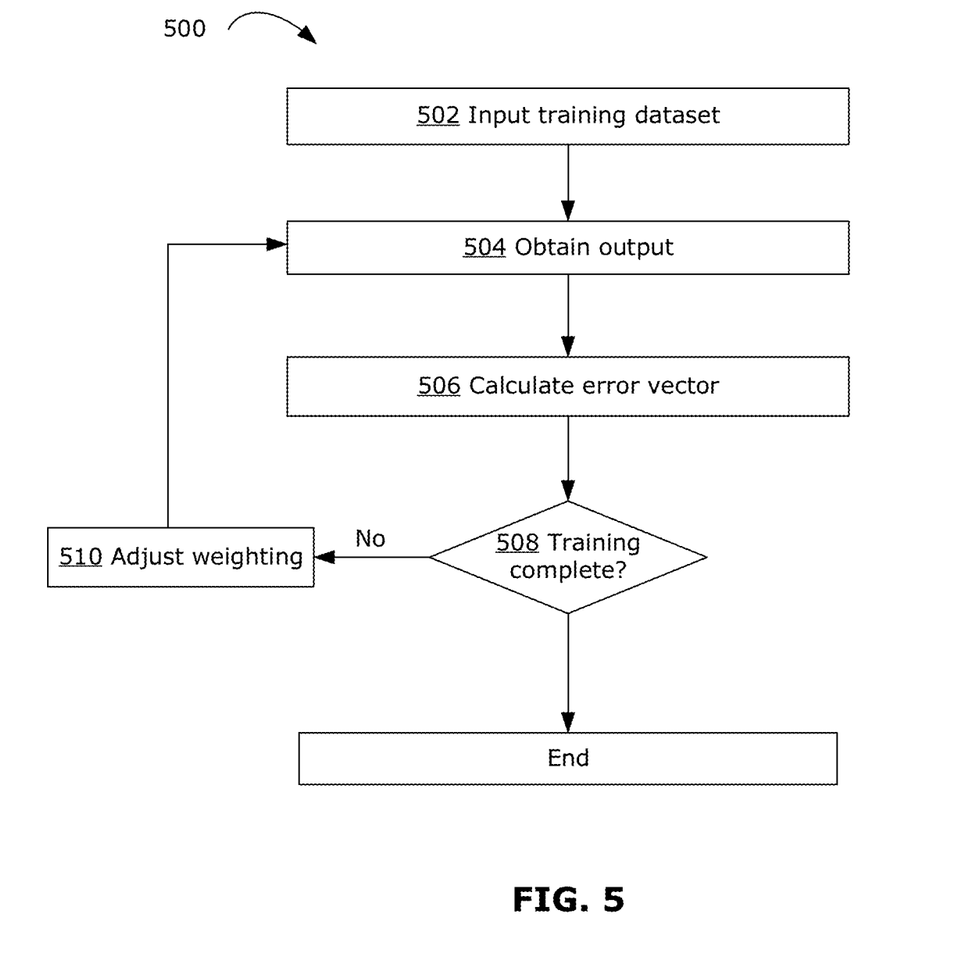
FIG. 5 is a flowchart illustrating an example method for training a neural network.

FIG. 5 is a flowchart illustrating an example method 500 for training a deep neural network to perform tracking, using a dataset that has been annotated with temporal information. It should be understood that other method of training a deep tracking neural network may also be performed, using an annotated dataset.

At 502, a training dataset is inputted to a DNN. The training dataset that is inputted at 502 does not contain tracking information, but has a corresponding annotated dataset that includes temporal tracking information assigned to each identified object in each frame. The temporal tracking information in the annotated data set includes target ID and track type (according to a particular track management scheme) assigned to each identified object in each frame. The annotated dataset may have been generated from the non-annotated dataset using the method 400 described above, for example.

At 502, output from the DNN is obtained. The output from the DNN is an attempt by the DNN to assign tracking information to the training dataset.

At 506, an error vector is calculated by comparing the output obtained at 502 to the annotated dataset.

At 508, it is determined whether training of the DNN is complete. For example, training may be determined to be complete when the error vector is below a predetermined threshold. If training is not complete, the method 500 proceeds to 510 to adjust weighting in the DNN, so as to reduce the error vector. The method 500 returns to 504. If training is complete, the DNN is considered to be trained for tracking and the method 500 ends.

Figure 6:
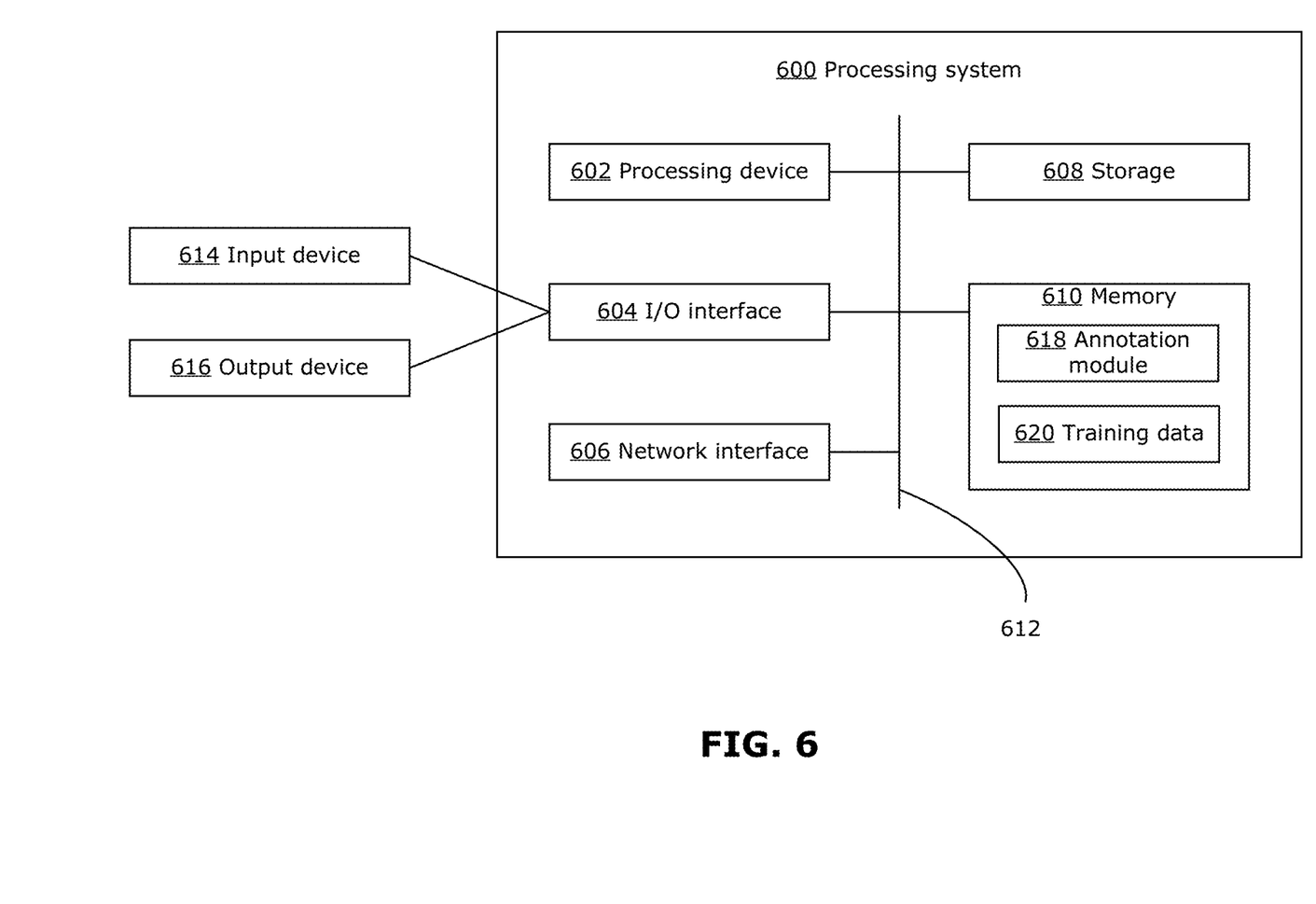
FIG. 6 is a block diagram illustrating an example processing system suitable for implementing examples disclosed herein.

The methods 400 and/or 500 may be performed using the example processing system 600 illustrated in FIG. 6.

FIG. 6 is a block diagram of an example simplified processing system 600, which may be used to implement embodiments disclosed herein, and provides a higher level implementation example. The method 400 may be implemented using the example processing system 600, or variations of the processing system 600. In some examples, the example processing system 600 may also implement the method 500. The processing system 600 could be a server or a desktop terminal, for example, or any suitable processing system. Other processing systems suitable for implementing embodiments described in the present disclosure may be used, which may include components different from those discussed below. Although FIG. 6 shows a single instance of each component, there may be multiple instances of each component in the processing system 600.

The processing system 600 may include one or more processing devices 602, such as a processor, a microprocessor, an application-specific integrated circuit (ASIC), a field-programmable gate array (FPGA), a dedicated logic circuitry, or combinations thereof. The processing system 600 may also include one or more input/output (I/O) interfaces 604, which may enable interfacing with one or more appropriate input devices 614 and/or output devices 616. The processing system 600 may include one or more network interfaces 606 for wired or wireless communication with a network (e.g., an intranet, the Internet, a P2P network, a WAN and/or a LAN) or other node. The network interfaces 606 may include wired links (e.g., Ethernet cable) and/or wireless links (e.g., one or more antennas) for intra-network and/or inter-network communications.

The processing system 600 may also include one or more storage units 608, which may include a mass storage unit such as a solid state drive, a hard disk drive, a magnetic disk drive and/or an optical disk drive. The processing system 600 may include one or more memories 610, which may include a volatile or non-volatile memory (e.g., a flash memory, a random access memory (RAM), and/or a read-only memory (ROM)). The non-transitory memory(ies) 610 may store instructions for execution by the processing device(s) 602, such as to carry out examples described in the present disclosure, for example to perform encoding or decoding. The memory(ies) 610 may include other software instructions, such as for implementing an operating system and other applications/functions. In some examples, one or more data sets and/or modules may be provided by an external memory (e.g., an external drive in wired or wireless communication with the processing system 600) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 612 providing communication among components of the processing system 600, including the processing device(s) 602, I/O interface(s) 604, network interface(s) 606, storage unit(s) 608 and/or memory(ies) 610. The bus 612 may be any suitable bus architecture including, for example, a memory bus, a peripheral bus or a video bus.

In FIG. 6, the input device(s) 614 (e.g., a keyboard, a mouse, a microphone, a touchscreen, and/or a keypad) and output device(s) 616 (e.g., a display, a speaker and/or a printer) are shown as external to the processing system 600. In other examples, one or more of the input device(s) 614 and/or the output device(s) 616 may be included as a component of the processing system 600. In other examples, there may not be any input device(s) 614 and output device(s) 616, in which case the I/O interface(s) 604 may not be needed.

The memory(ies) 610 may include instructions for executing an annotation module 618 that, when executed, causes the processing system 600 to perform a method for automated annotation of a dataset, such as the method 400. The memory(ies) 610 may further store training data 620, which may include training data 620 to be annotated by the annotation module 618 and/or training data 620 that has been annotated by the annotation module 618.

Figure 7:
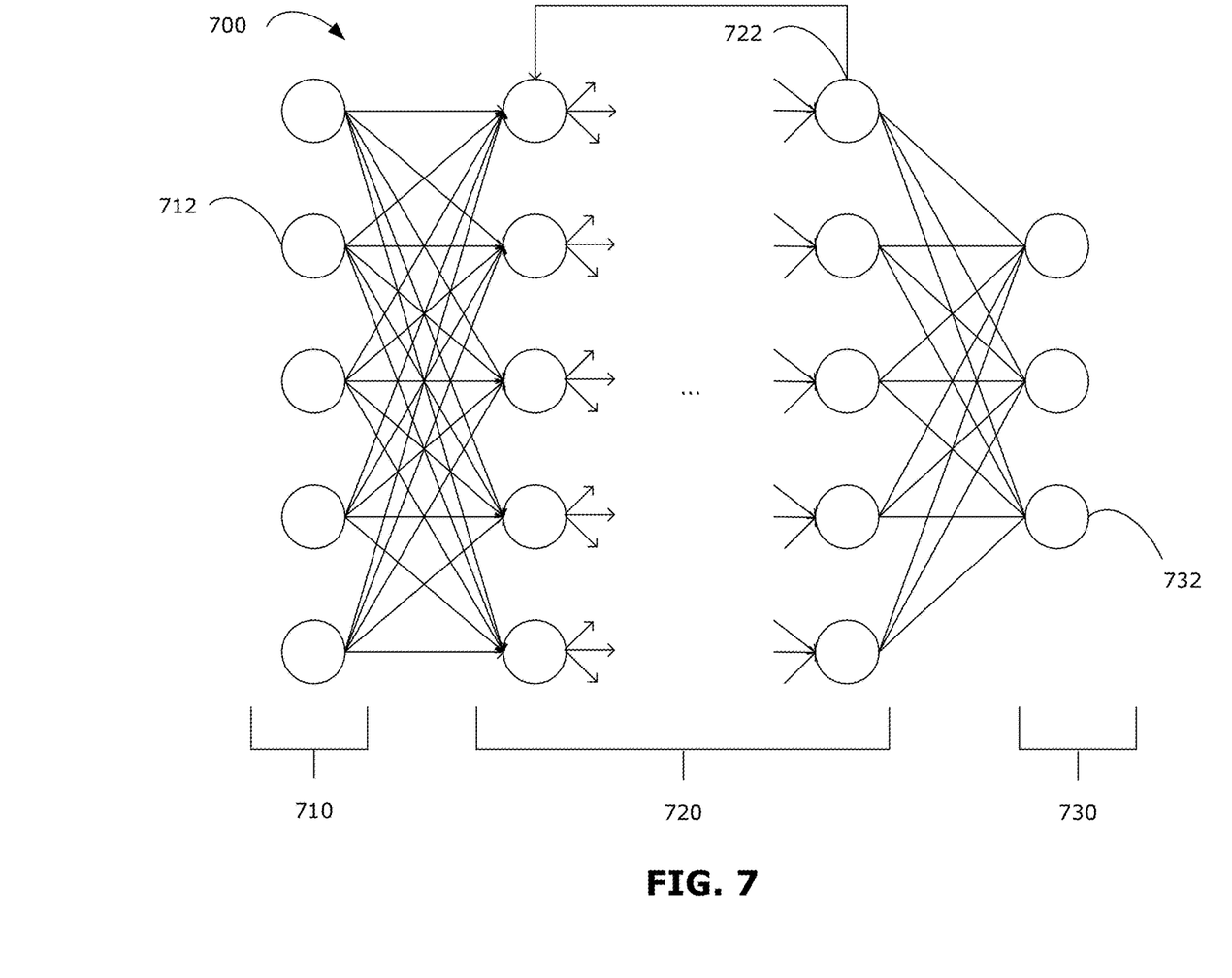
FIG. 7 is a block diagram illustrating an example deep neural network.

FIG. 7 illustrates an example DNN 700 that may be trained using a dataset that has been annotated with temporal information, such as the annotated dataset outputted by the method 400. The DBB 700 may be trained, such as using the method 500, to generate a deep tracking neural network for object tracking. It should be understood that FIG. 7 is a simplified illustration of a DNN 700.

The DNN 700 includes an input layer 710 comprising a plurality of input nodes 712. Training data is inputted to the input layer 710. The DNN 700 includes a plurality of hidden layers 720, each hidden layer 720 comprising a plurality of hidden nodes 722. Generally, the greater the number of hidden layers 720, the "deeper" the DNN 700. The DNN 700 also includes an output layer 730 comprising at least one output node 732.

The nodes of the DNN 700 are connected in a feedforward configuration. Each input node 712 feeds to each hidden node 722 in the first hidden layer 720. Each hidden node 722 feeds to each hidden node 722 in a subsequent hidden layer 720. The hidden nodes 722 of the last hidden layer 720 feeds to the output node(s) 732 of the output layer 730. Further, one or more feedback channels (one illustrated in FIG. 7 for simplicity) may be used, such as in a recurrent neural network. In an example, each connection between nodes has an associated weight, and the weights are adjusted during training of the DNN 700. After the DNN 700 has been properly trained for tracking using annotated datasets, the DNN 700 can receive sensor data in the input layer 710 and output tracked data in the output layer 730.

The DNN 700 may be implemented by any suitable processing unit, including the processing system 600 or variant thereof. Further, any suitable neural network, including variations such as recurrent neural networks long short-term memory (LSTM) neural networks, or any other neural network, may be used to implement a deep tracking neural network.

Although the present disclosure may describe methods and processes with steps in a certain order, one or more steps of the methods and processes may be omitted or altered as appropriate. One or more steps may take place in an order other than that in which they are described, as appropriate.

Although the present disclosure may be described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating an annotated temporal frame for an annotated dataset used for training a deep tracking neural network, the method comprising:
for an object of interest identified in a given temporal frame included in a sequence of temporal frames:
calculating a likelihood function to correlate a feature score of the object of interest with respective feature scores associated with each one of one or more target identifiers (IDs) previously assigned to respective objects of interest in a selected range of the sequence of temporal frames, wherein each temporal frame in the selected range of the sequence of temporal frames is a previously annotated temporal frame;
assigning a target ID to the object of interest by:
identifying a previously assigned target ID associated with a highest value of the calculated likelihood function and assigning the identified target ID to the object of interest; or
initiating a new target ID when none of the previously assigned target IDs is associated with a value of the calculated likelihood function that satisfies a predetermined threshold and assigning the initiated new target ID to the object of interest; and
performing track management according to a predefined track management scheme to assign a track type to the object of interest;
iterating the calculating, assigning and performing for all objects of interest identified in the given temporal frame;
annotating the given temporal frame to include all target IDs and track types assigned to all objects of interest identified in the given temporal frame; and
adding the annotated given temporal frame to the annotated dataset, wherein the annotated dataset includes previously annotated temporal frames, each previously annotated temporal frame including target IDs and track types assigned to all objects of interest in the previously annotated temporal frame.

2. The method of claim 1, further comprising:
when there is no previously annotated temporal frame, annotating the given temporal frame by:
initiating and assigning a new target ID to each object of interest identified in the given temporal frame; and
adding the annotated given temporal frame as a first annotated temporal frame in the annotated dataset.

3. The method of claim 1, further comprising:
obtaining object labels for all objects of interest identified in the given temporal frame.

4. The method of claim 3, wherein obtaining object labels comprises applying an object detection algorithm.

5. The method of claim 1, further comprising:
obtaining feature scores for all objects of interest identified in the given temporal frame.

6. The method of claim 5, wherein obtaining feature scores comprises calculating a feature map function for each object.

7. The method of claim 1, further comprising:
performing track management again on the annotated dataset, using a different track management scheme, to obtain a different annotated dataset containing track types differently assigned to all objects of interest.

8. A system comprising:
a processor; and
a memory coupled to the processor, the memory storing computer-executing instructions that, when executed by the processor, cause the system to:
for an object of interest identified in a given temporal frame included in a sequence of temporal frames:
calculate a likelihood function to correlate a feature score of the object of interest with respective feature scores associated with each one of one or more target identifiers (IDs) previously assigned to objects of interest in a selected range of the sequence of temporal frames, wherein each temporal frame in the selected range of the sequence of temporal frames is a previously annotated temporal frame;
assign a target ID to the object of interest by:
identifying a previously assigned target ID associated with a highest value of the calculated likelihood function and assigning the identified target ID to the object of interest; or
initiating a new target ID when none of the previously assigned target IDs is associated with a value of the calculated likelihood function that satisfies a predetermined threshold and assigning the initiated new target ID to the object of interest; and
perform track management according to a predefined track management scheme to assign a track type to the object of interest;
iterate the calculating, assigning and performing for all objects of interest identified in the given temporal frame;
annotate the given temporal frame to include all target IDs and track types assigned to all objects of interest identified in the given temporal frame; and
add the annotated given temporal frame to an annotated dataset, wherein the annotated dataset includes previously annotated temporal frames, each previously annotated temporal frame including target IDs and track types assigned to all objects of interest in the previously annotated temporal frame.

9. The system of claim 8, wherein the instructions, when executed by the processor, further cause the system to:
when there is no previously annotated temporal frame, annotate the given temporal frame by:
initiating and assigning a new target ID to each object of interest identified in the given temporal frame; and
adding the annotated given temporal frame as a first annotated temporal frame in the annotated dataset.

10. The system of claim 8, wherein the instructions, when executed by the processor, further cause the system to:
obtain object labels for all objects of interest identified in the given temporal frame.

11. The system of claim 10, wherein obtaining object labels comprises applying an object detection algorithm.

12. The system of claim 8, wherein the instructions, when executed by the processor, further cause the system to:
    obtain feature scores for all objects of interest identified in the given temporal frame.

13. The system of claim 12, wherein obtaining feature scores comprises calculating a feature map function for each object.

14. The system of claim 8, wherein the instructions, when executed by the processor, further cause the system to:
    perform track management again on the annotated dataset, using a different track management scheme, to obtain a different annotated dataset containing track types differently assigned to all objects of interest.

15. A non-transitory computer-readable medium comprising instructions which, when executed by a processing unit cause the processing unit to generate an annotated temporal frame for an annotated dataset used for training a deep tracking neural network by:
    for an object of interest identified in a given temporal frame included in a sequence of temporal frames:
        calculating a likelihood function] to correlate a feature score of the object of interest with respective feature scores associated with each one of one or more target identifiers (IDs) previously assigned to respective objects of interest in a selected range of the sequence of temporal frames, wherein each temporal frame in the selected range of the sequence of temporal frames is a previously annotated temporal frame;
        assigning a target ID to the object of interest by:
            identifying a previously assigned target ID associated with a highest value of the calculated likelihood function and assigning the identified target ID to the object of interest; or
            initiating a new target ID when none of the previously assigned target IDs is associated with a value of the calculated likelihood function that satisfies a predetermined threshold and assigning the initiated new target ID to the object of interest; and
        performing track management according to a predefined track management scheme to assign a track type to the object of interest;
    iterating the calculating, assigning and performing for all objects of interest identified in the given temporal frame;
    annotating the given temporal frame to include all target IDs and track types assigned to all objects of interest identified in the given temporal frame; and
    adding the annotated given temporal frame to the annotated dataset, wherein the annotated dataset includes previously annotated temporal frames, each previously annotated temporal frame including target IDs and track types assigned to all objects of interest in the previously annotated temporal frame.

16. The non-transitory computer-readable medium of claim 15, further comprising instructions which, when executed by the processing unit cause the processing unit to:
    when there is no previously annotated temporal frame, annotating the given temporal frame by:
        initiating and assigning a new target ID to each object of interest identified in the given temporal frame; and
        adding the annotated given temporal frame as a first annotated temporal frame in the annotated dataset.

17. The non-transitory computer-readable medium of claim 15, further comprising instructions which, when executed by the processing unit cause the processing unit to:
    obtaining object labels for all objects of interest identified in the given temporal frame.

18. The non-transitory computer-readable medium of claim 17, wherein obtaining object labels comprises applying an object detection algorithm.

19. The non-transitory computer-readable medium of claim 15, further comprising instructions which, when executed by the processing unit cause the processing unit to:
    obtaining feature scores for all objects of interest identified in the given temporal frame.

20. The non-transitory computer-readable medium of claim 15, wherein obtaining feature scores comprises calculating a feature map function for each object.

\* \* \* \* \*